(No Model.)
O. C. LOOK.
COMBINED CLOD CRUSHER AND ROLLER.
No. 391,375. Patented Oct. 16, 1888.
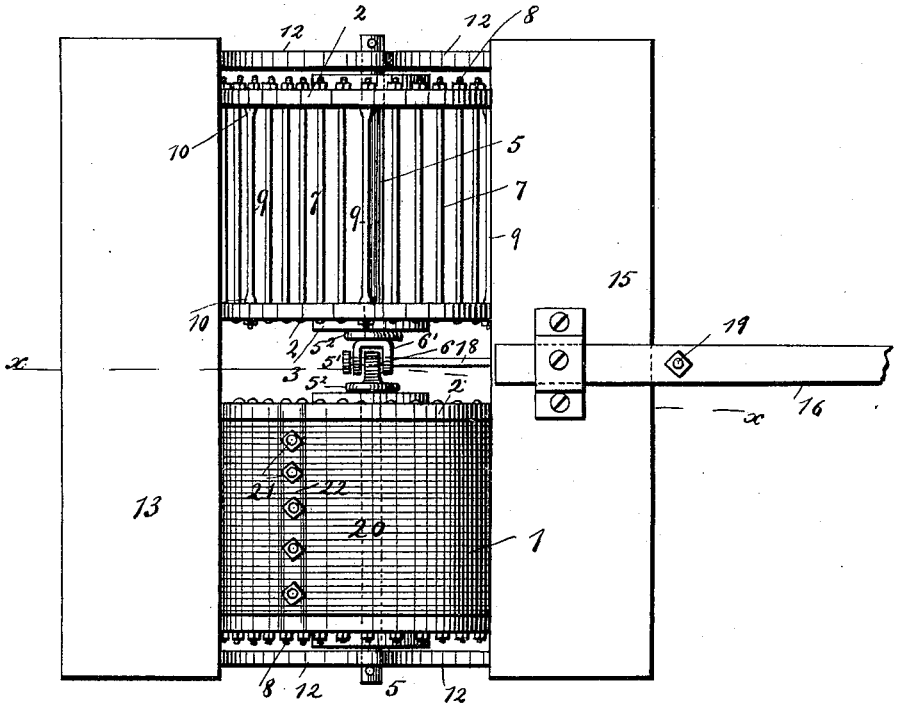
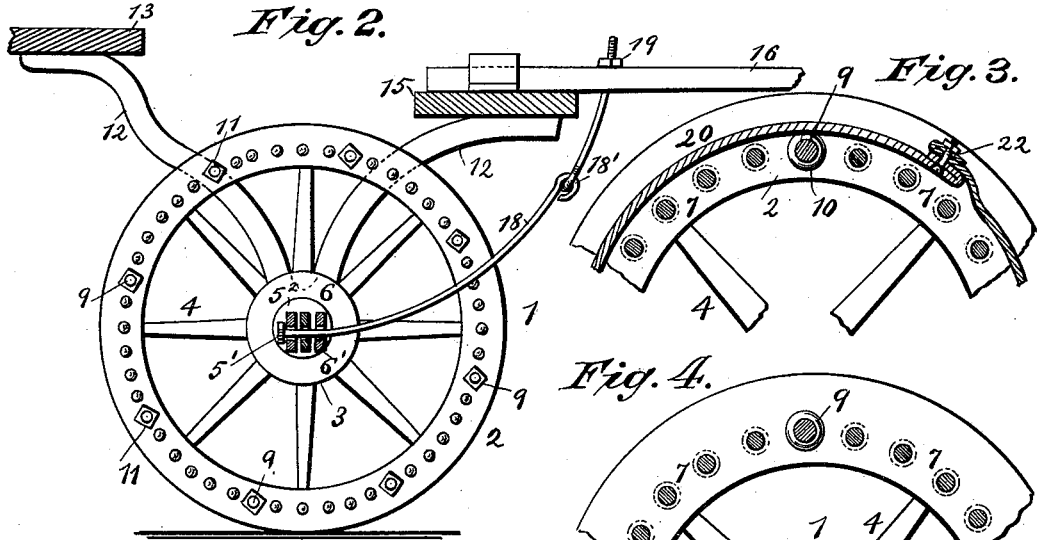
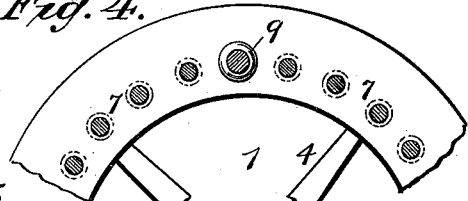
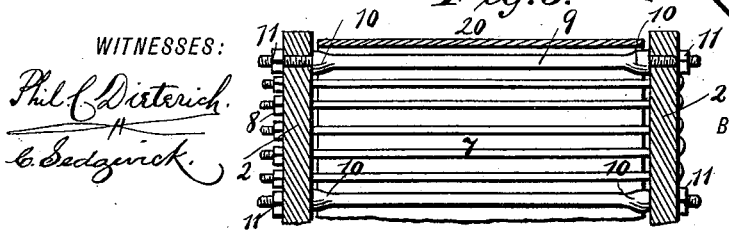
WITNESSES:
Phil. C. Dieterich.
C. Sedgwick.
INVENTOR,
O. C. Look.
BY
Munn & Co.
ATTORNEY.
N. PETERS, Photo-Lithographer, Washington, D. C.

UNITED STATES PATENT OFFICE.

OLIVER C. LOOK, OF COLLINSVILLE, ILLINOIS.

COMBINED CLOD-CRUSHER AND ROLLER.

SPECIFICATION forming part of Letters Patent No. 391,375, dated October 16, 1888.

Application filed April 17, 1888. Serial No. 271,116. (No model.)

*To all whom it may concern:*

Be it known that I, OLIVER C. LOOK, of Collinsville, in the county of Madison and State of Illinois, have invented a new and Improved Combined Clod-Crusher and Roller, of which the following is a full, clear, and exact description.

This invention relates to the class of machines called "land-rollers," which are constructed to crush the earth and then roll it; and the invention has for its object to provide such a machine so constructed and arranged that it will operate in an effective manner and be strong and durable.

The invention will be set forth in the following description, and pointed out in the claims.

Reference is to be had to the accompanying drawings, forming a part of this specification, in which similar figures of reference indicate corresponding parts in all the views.

Figure 1 represents a plan view of the device. Fig. 2 is a side view in vertical section on the line $x\ x$ of Fig. 1. Fig. 3 is a detail vertical sectional end view of one of the wheels arranged for rolling. Fig. 4 is a similar view of part of one of the wheels arranged for crushing, and Fig. 5 is a detail front view in vertical section of one of the wheels when arranged as a roller.

In carrying out this invention I provide two or more rollers, 1, constructed each with two wheels consisting of rim 2, hub 3, and spokes 4. The hubs 3 are mounted on axles 5, connected together by means of a vertically-yielding joint, 6, so as to allow for the irregular movement of the rollers 1 over the uneven surface of the ground. The joint 6 consists of the U-shaped end 6' on one of the axles 5, connected with the flattened end of the other axle by the headed end of a rod, hereinafter described. The rollers 1 are loosely mounted on the axles 5 and held in place by collars 5² on the axles.

Midway between every two spokes of the rims 2 is located a large steel rod, 9, having flanges 10, which bear against the inner side of the rim 2 and are tightly secured in place by means of nuts 11. The rims 2 are further connected by small headed metal rods 7, secured and tightened in place by means of nuts 8, whereby the rims are drawn toward each other, and the rods 7 are rigidly held in place by means of their tension. The flanges 10 prevent the rims from approaching each other, and serve as stops against which the rims 2 press when the rods 7 are drawn up by means of their nuts 8. The rods 7, being thus braced and held under tension, will not bend and will be sufficiently rigid to meet the resistance required when crushing the earth.

The outer ends of the axles 3 are mounted in forked bracket-arms 12, extending upwardly and toward the rear and front of the machine. A cross-board, 13, is secured to the rear bracket-arms, 12, and is located about a foot higher than the front cross-board, 15, supported by the forward bracket-arms, 12. The cross-board 13 is employed as a driver's seat. The tongue 16 is secured to cross-board 15. By means of this construction it will be seen that the weight of the tongue will be taken off from the necks of the team and will give additional clod-crushing power. If necessary, either or both of the cross-bars may be weighted to increase the crushing power.

The yielding joint 6 is mounted on and supported by the headed end 5' of a rod-connection, 18, extending forward and upward to the tongue 16, and secured thereto by a nut, 19. The rod 18 is rendered flexible by means of a hooked joint, 18'. The joint 6 yields vertically, and is accommodated in its movements by the flexible rod 18, which also prevents the joint 6 from yielding rearwardly. More than one flexible joint may be used in rod 18, if desired.

In order to use the machine as a roller, the rotary crushers are covered with a sheet of metal, as illustrated in Fig. 1 of the drawings, in which the sheet 20 is shown applied to one of the crushers only; but in use both or all the crushers are to be covered with sheet metal. The sheet 20 is bent over the rods 7 and 9, and is secured in place by means of a nut and bolt, 21, passing through the overlapping or re-enforcing ends 22 of the sheet 20. Only a few bolts are necessary to secure the sheet in place, so that it may be readily attached or detached, its lateral edges fitting snugly against the rims 2 of the crushers.

In operation, the machine being drawn forward, the rods 7 and 9 will thoroughly break up and crush the clods of earth over which the crushers pass, and the latter will readily adapt themselves to the irregular surfaces of the ground by means of the flexible joint 6. When the clods in a section of ground have been crushed, the crushers are converted into rollers by quickly applying the sheets 20 and securing them to the crushers, as hereinbefore described, and the machine is then drawn over the crushed earth and acts as a roller to roll and smooth and pack the same. The construction and arrangement of the crushers with the small metal rods 7 and large brace-rods 9 render them very strong and durable, there being no danger of the rods breaking, and the latter will crush the earth in a very effective manner.

The machine is also very light and can be readily converted from a crusher into a roller, and vice versa.

Having thus described my invention, what I claim as new, and desire to secure by Letters Patent, is—

1. The combination, with the frame and tongue, of the two rollers, the axles 5, carrying said rollers and journaled at their outer ends on the side bars of the frame, the inner end of one of the said axles having a transversely-apertured longitudinally-extending fork, and the inner end of the other axle entering said fork and having a transverse aperture, the rod 18, secured to the tongue, jointed, as at 18′, extending through apertured ends of said axles and having a head, 5′, in rear of said joint, substantially as set forth.

2. The combination, with the two heads or wheels 1, and cross screw-rods 7, connecting the outer parts or rims thereof, of supplemental connecting-rods 9, having flanges 10 near their opposite threaded ends, and nuts 11 on the outer ends of rods 9 and forcing the inner faces of the heads against said flanges 10, substantially as set forth.

3. An earth-crushing machine constructed with rotary crushers 1, each consisting of pairs of wheels having their rims connected by small metal rods 7 with nuts 8, and large brace-rods 9 with flanges 10 and nuts 11, the rotary crushers being mounted on axles 5, having their inner ends united by means of the yielding joint 6 and their outer ends resting in the bracket-arms 12, cross boards 13 and 15, secured upon the arms 12 on the rear board, 13, and a tongue, 16, secured to the front board, 14, with jointed rod 18, fastened to tongue 16 and having its headed inner end connected with the joint of the axles 5, substantially as described.

OLIVER C. LOOK.

Witnesses:
 JOE WILSON,
 S. B. ANTHIS.